US012340563B2

United States Patent
Salamon et al.

(10) Patent No.: US 12,340,563 B2
(45) Date of Patent: Jun. 24, 2025

(54) SELF-SUPERVISED AUDIO-VISUAL LEARNING FOR CORRELATING MUSIC AND VIDEO

(71) Applicant: Adobe Inc., San Jose, CA (US)

(72) Inventors: Justin Salamon, San Francisco, CA (US); Bryan Russell, San Francisco, CA (US); Didac Suris Coll-Vinent, New York, NY (US)

(73) Assignee: Adobe Inc., San Jose, CA (US)

( * ) Notice: Subject to any disclaimer, the term of this patent is extended or adjusted under 35 U.S.C. 154(b) by 423 days.

(21) Appl. No.: 17/742,322

(22) Filed: May 11, 2022

(65) Prior Publication Data

US 2023/0368503 A1 Nov. 16, 2023

(51) Int. Cl.
*G06V 10/774* (2022.01)
*G06V 10/74* (2022.01)
(Continued)

(52) U.S. Cl.
CPC .......... *G06V 10/774* (2022.01); *G06V 10/761* (2022.01); *G06V 20/46* (2022.01);
(Continued)

(58) Field of Classification Search
CPC ...... G06V 10/774; G06V 20/49; G06V 20/46; G06V 10/761; G10L 25/03; G10L 25/57
See application file for complete search history.

(56) References Cited

U.S. PATENT DOCUMENTS 12,205,614 B1 * 1/2025 Sharma .................... G10L 25/30
2021/0272599 A1 * 9/2021 Patterson ................. G06N 3/08
(Continued)

FOREIGN PATENT DOCUMENTS

WO    WO-2021184026 A1 *  9/2021

OTHER PUBLICATIONS

Laure Prétet, Gaël Richard, Clément Souchier, and Geoffroy Peeters. 2023. Video-to-Music Recommendation Using Temporal Alignment of Segments. Trans. Multi. 25 (2023), 2898-2911. https://doi.org/10.1109/TMM.2022.3152598 (Year: 2022).*

(Continued)

*Primary Examiner* — Vu Le
*Assistant Examiner* — Jack Peter Kraynak
(74) *Attorney, Agent, or Firm* — Nicholson De Vos Webster & Elliot LLP

(57) ABSTRACT

Embodiments are disclosed for correlating video sequences and audio sequences by a media recommendation system using a trained encoder network. In particular, in one or more embodiments, the disclosed systems and methods comprise receiving a training input including a media sequence, including a video sequence paired with an audio sequence, segmenting the media sequence into a set of video sequence segments and a set of audio sequence segments, extracting visual features for each video sequence segment and audio features for each audio sequence segment, generating, by transformer networks, contextualized visual features from the extracted visual features and contextualized audio features from the extracted audio features, the transformer networks including a visual transformer and an audio transformer, generating predicted video and audio sequence segment pairings based on the contextualized visual and audio features, and training the visual transformer and the audio transformer to generate the contextualized visual and audio features.

18 Claims, 10 Drawing Sheets

(51) Int. Cl.
  *G06V 20/40* (2022.01)
  *G10L 25/03* (2013.01)
  *G10L 25/57* (2013.01)

(52) U.S. Cl.
  CPC .............. *G06V 20/49* (2022.01); *G10L 25/03* (2013.01); *G10L 25/57* (2013.01)

(56) References Cited

U.S. PATENT DOCUMENTS

| | | | | |
|---|---|---|---|---|
| 2021/0303866 | A1* | 9/2021 | Chen | G06V 10/82 |
| 2021/0321172 | A1* | 10/2021 | Krishnamurthy | G06N 3/04 |
| 2022/0044022 | A1* | 2/2022 | Gan | G06V 20/46 |
| 2022/0156501 | A1* | 5/2022 | Zhang | G06N 3/045 |
| 2022/0366881 | A1* | 11/2022 | Williams | G06V 20/46 |

OTHER PUBLICATIONS

Zeng, D., Yu, Y., & Oyama, K. (2018). Audio-Visual Embedding for Cross-Modal Music Video Retrieval through Supervised Deep CCA. 2018 IEEE International Symposium on Multimedia (ISM), 143-150. (Year: 2018).*

Lamba, J., Abhishek, Akula, J., Dabral, R., Jyothi, P., & Ramakrishnan, G. (2021). Cross-Modal learning for Audio-Visual Video Parsing. ArXiv, abs/2104.04598. (Year: 2021).*

Y. Zhu, Y. Wu, H. Latapie, Y. Yang and Y. Yan, "Learning Audio-Visual Correlations From Variational Cross-Modal Generation," ICASSP 2021-2021 IEEE International Conference on Acoustics, Speech and Signal Processing (ICASSP), Toronto, ON, Canada, 2021, pp. 4300-4304 (Year: 2021).*

Ferraro, et al. "Break the loop: Gender imbalance in music recommenders," Proceedings of the 2021 Conference on Human Information Interaction and Retrieval, CHIIR '21, Mar. 14-19, 2021, p. 249-254.

Ghose et al., "AutoFoley: Artificial Synthesis of Synchronized Sound Tracks for Silent Videos with Deep Learning," IEEE Transactions on Multimedia, Feb. 2020, 14 pages.

Karkkainen et al., "Fairface: Face attribute dataset for balanced race, gender, and age for bias measurement and mitigation," Proceedings of the IEEE/CVF Winter Conference on Applications of Computer Vision, 2021, pp. 1548-1558.

Paszke et al., "PyTorch: An imperative style, high-performance deep learning library," 33rd Conference on Neural Information Processing Systems (NeurIPS 2019), 2019, pp. 8024-8035.

* cited by examiner

SELF-SUPERVISED AUDIO-VISUAL LEARNING FOR CORRELATING MUSIC AND VIDEO

BACKGROUND

Music is a crucial component of media creation, such as soundtracks in feature film, music for advertisements, background music in video blogs, or creative uses of music in social media. However, choosing the right music for a given video is a difficult task—a user needs to determine what kind of music to use, and then perform a search for determined kind of music. Each of these tasks presents difficulties: choosing the right music to set the mood of a video can be hard for non-professionals, and even when the user knows what type of music desired, it can be hard to search for it using conventional text-based methods, e.g., it can be difficult to describe the "feel" of a song in words, and metadata-based search engines are not well suited for this task. Similarly, video editing can require matching video sequences to an audio sequence. For example, given a set of video sequences, determining a subset of the video sequences that best match an audio sequence can be difficult, and even more challenging to determine the best order of the subset of the video sequences.

Existing solutions have limitations and drawbacks, as some can require manual annotation of video and audio, which can be time-consuming and difficult with data at large scales.

SUMMARY

Introduced here are techniques/technologies that allow a media recommendation system to correlate video sequences and audio sequences. The media recommendation system can find audio sequences that best correspond temporally and artistically to an input video sequence, and vice versa, based on both their temporal alignment and their correspondence at an artistic level.

In particular, in one or more embodiments, a media recommendation system can receive a video sequence as an input, segment the video sequence into a plurality of segments, and analyze the video sequence segment-by-segment to generate separate video embeddings (e.g., visual features or a feature vector) representing the video sequence segments of the video sequence. The media recommendation system can then use a transformer encoder network to generate contextualized visual features for each segment that take into account the visual features of a segment and the visual features of neighboring segments. The contextualized visual features can then be compared with contextualized audio features for either catalog audio sequence or input audio sequences to identify most similar video and audio segment pairings based on their extracted features.

The transformer encoder network is trained using training data that includes artistically paired audio and video (e.g., music video, film clips, etc.).

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
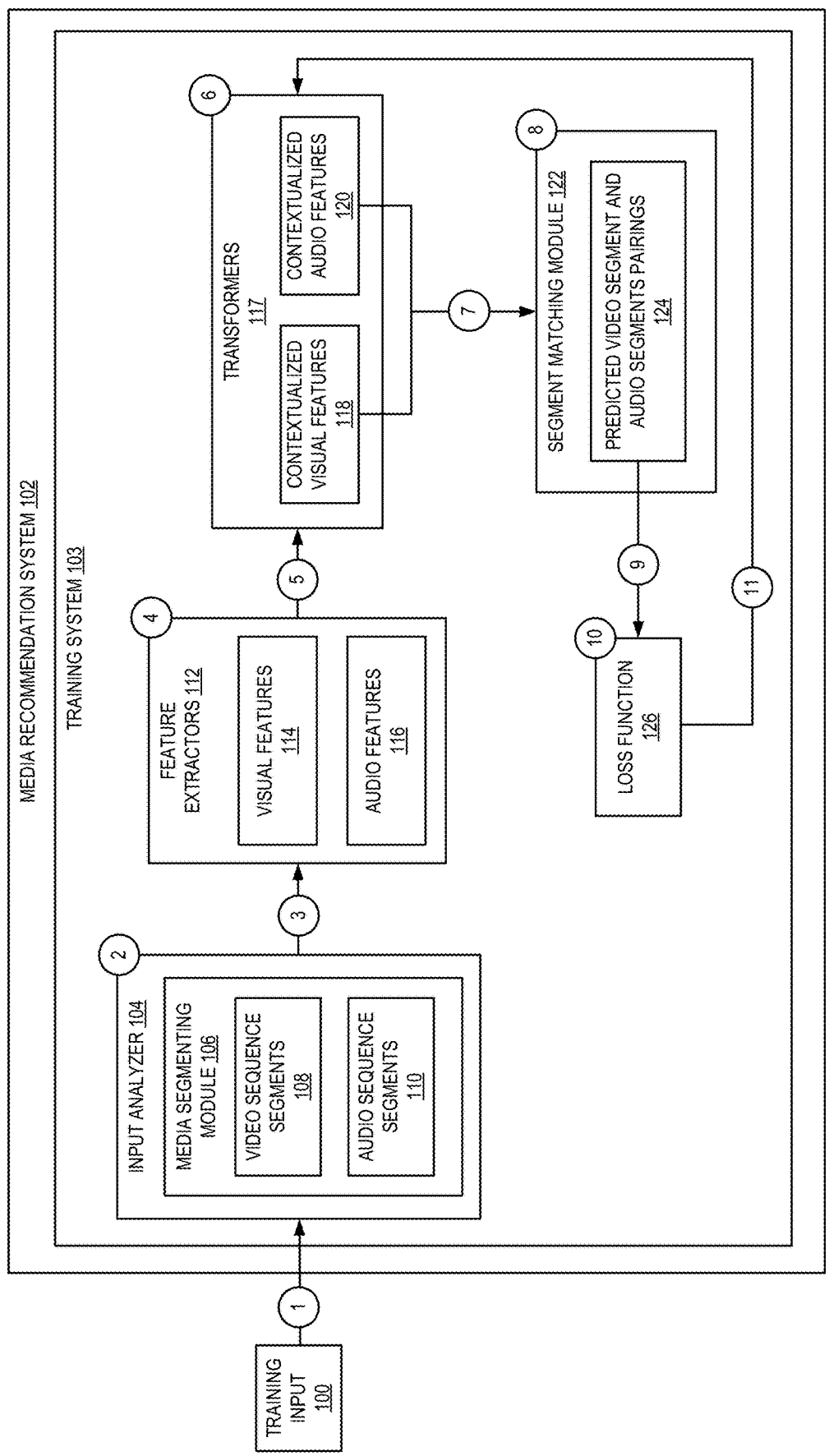
FIG. 1 illustrates a diagram of a process of training a machine learning model to correlate video sequences and audio sequences for recommending media sequences in accordance with one or more embodiments.

One or more embodiments of the present disclosure include a media recommendation system that uses a trained encoder network to generate contextualized features from audio and video that are used to generate a recommend audio sequence for a given video sequence, and vice versa. Audio and video are not only signals with a strong temporal component, they are also synchronized, where changes in one modality are temporally aligned with changes in the other modality. Therefore, temporal context heavily impacts audiovisual correspondence. To model temporal context, the media recommendation system uses transformer networks, whose attention mechanisms compute how much each element (e.g., segment) of a video sequence (or audio sequence) has to attend to every other element (e.g., segment) in the video sequence (or audio sequence).

Some existing solutions are directed to establishing physical correspondences for discrete events between the two modalities (e.g., the sound of a person clapping with the visual motion of the person performing a clapping action), such correspondences are predominantly not the deciding factor for pairing music with video. For example, the determining factors for the pairing task can often be "artistic" and non-physical, and may be based on the overall visual style or aesthetics of the video, and the genre, mood or "feel" of the music. Thus, solutions that focus on physical correspondences can fail to accurately pair music and video.

While some existing solutions use a heuristics-based approach that consider only the general mood of the video and audio sequences, these have their limitations and drawbacks as well. The mood categories are annotated independently for the two modalities and require manual annotations for every video and audio sequence. This can create challenges as it can be difficult to manually collect annotated data at large scales describing the mood of video and audio. Further, the correspondence can be restricted to a limited number of pre-defined discrete categories.

Other existing solutions use a cross-modal ranking loss. To avoid losing modality-specific characteristics, these solutions introduce a soft within-modality loss that leverages the relative distance relationship between intra-modal samples before embedding. Some of these solutions train cross-modal embeddings with emotion tags as supervision, which do not scale to large amounts of data.

To address these issues, after receiving an input video sequence, the media recommendation system analyzes the input video sequence to generate context-aware visual embeddings, or visual feature vectors, each representing the visual features of a segment of the input video sequence, where each segment can correspond to a scene or portions of one or more scenes of the input video sequence. The media recommendation system then retrieves audio sequences from a pre-processed media catalog to retrieve context-aware audio embeddings, or audio feature vectors, for catalog audio sequences, where each audio sequence in the media catalog is associated with a plurality of context-aware audio embeddings representing segments of each audio sequence. The media recommendation system then compares the context-aware visual embedding for each segment of the input video sequence against context-aware audio embeddings for segments of the catalog audio sequences. The media recommendation system can then generate pairing data indicating the audio segments whose context-aware audio embeddings are most similar to the context-aware visual embeddings of each segment of the input video sequence.

By performing audio-visual learning for correlating audio and video by considering the temporal context of the audio and/or video, the embodiments described herein provide a significant increase in speed and scalability. For example, by learning on large collections of artistically paired audio and video, the media recommendation system described herein is trained to determine how well a paired video and audio clip correspond, where this correspondence is learned directly from video and audio data without requiring any manual labeling.

FIG. 1 illustrates a diagram of a process of training a machine learning model to correlate video sequences and audio sequences for recommending media sequences in accordance with one or more embodiments. In one or more embodiments, a training system 103 is configured to train a neural network (e.g., transformers 117) to correlate audio and video based on training inputs (e.g., paired audio and video segments). In some embodiments, the training system 103 is a part of a media recommendation system 102. In other embodiments, the training system 103 can be a standalone system, or part of another system, and deployed to the media recommendation system 102. For example, the training system 103 may be implemented as a separate system implemented on electronic devices separate from the electronic devices implementing media recommendation system 102. As shown in FIG. 1, the training system 103 receives a training input 100, as shown at numeral 1. For example, the media recommendation system 102 receives the training input 100 from a user via a computing device or from a memory or storage location. In one or more embodiments, the training input 100 includes at least a paired audio sequence and video sequence (e.g., a music video, film/television clips, or any other video sequence that includes music or audio correlated to, or artistically paired with, visual imagery in the video sequence). The training input 100 can include multiple paired audio and video sequences that can be fed to the training system 103 in parallel or in series. The paired audio and video sequences can be a subset of a larger training dataset.

As illustrated in FIG. 1, the media recommendation system 102 includes an input analyzer 104 that receives the training input 100. In some embodiments, the input analyzer 104 analyzes the training input 100, as shown at numeral 2. In some embodiments, the input analyzer 104 analyzes the training input 100 to identify the music video.

The input analyzer 104 can further include a media segmenting module 106 configured to split the music video into a separate video sequence and audio sequence. In one or more embodiments, the input analyzer 104 can extract an audio sequence and a video sequence from the music video. The media segmenting module 106 can then break up or divide each sequence into a plurality of segments, resulting in video sequence segments 108 and audio sequence segments 110.

Figure 2:
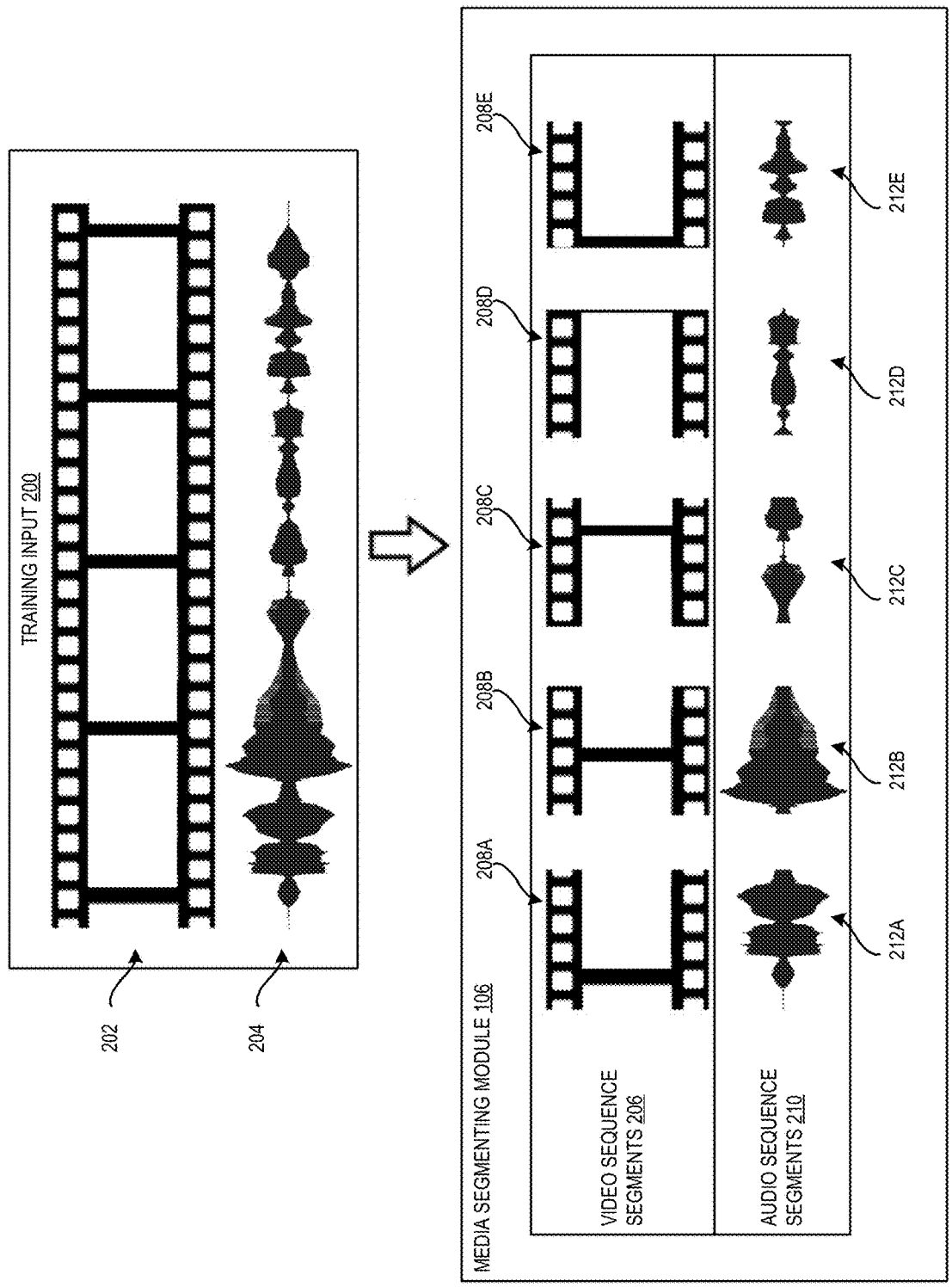
FIG. 2 illustrates an example training input used to train the machine learning model in accordance with one or more embodiments.

FIG. 2 illustrates an example training input used to train the machine learning model in accordance with one or more embodiments. In one or more embodiments, the training input 200 can include a music video created by artistically pairing a video sequence 202 and an audio sequence 204. One or both of the video sequence 202 and the audio sequence 204 can be a combination of a plurality of smaller sequences. As illustrated in FIG. 2, when the training input 200 is processed by the media segmenting module 106, the media segmenting module 106 divides the paired video and audio sequences into L segments, each of duration t. For example, processing training input 200 through the media segmenting module 106, where L is defined as five, results in video sequence segments 206, including video segments 208A-E, and audio sequence segments 210, including audio segments 212A-E. Each of video segments 208A-E and audio segments 212A-E is of the same duration t. Each video segment 208A-E can correspond to a scene or a portion of one or more scenes.

Returning to FIG. 1, after the input analyzer 104 analyzes the training input 100, the video sequence segments 108 and the audio sequence segments 110 are sent to features extractors 112, as shown at numeral 3. In one or more embodiments, the features extractors 112 are configured to extract strong modality-specific base features from the video sequence segments 108 and the audio sequence segments 110, as shown at numeral 4. In some embodiments, the features extractors 112 are configured to extract visual features 114 from each of the video sequence segments 108. Similarly, the features extractors 112 are configured to extract audio features 116 from each of the audio sequence segments 110. The visual features 114 and the audio features 116 can be feature vectors that are n-dimensional vectors of numerical features that represent the video sequence and the audio sequence, respectively, where each of the video sequence segments 108 and each of the audio sequence segments 110 are represented by separate feature vectors. After the features extractors 112 generate the visual features 114 and the audio features 116, the visual features 114 and the audio features 116 are sent to transformers 117, as shown at numeral 5.

In one or more embodiments, the transformers 117 include transformer encoder neural networks, including a visual transformer and an audio transformer. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the transformers 117 generates contextualized visual features 118 based on the visual features 114 and contextualized audio features 120 based on the audio features 116 that are separately derived, as shown at numeral 6. A visual transformer generates contextualized visual features 118, or a contextualized feature vector, for each of the video sequence segments 108. The contextualized visual features 118 for a specific video segment is based on the visual features for the specific video sequence segment, in addition to visual features from other video sequence segments preceding and/or following the specific video sequence segment. Similarly, an audio transformer generates contextualized audio features 120 for each of the audio sequence segments 110, where contextualized audio features 120 for a specific audio segment is based on the audio features for the specific audio segment and the audio features from other audio sequence segments preceding and/or following the specific audio sequence segment.

Figure 3:
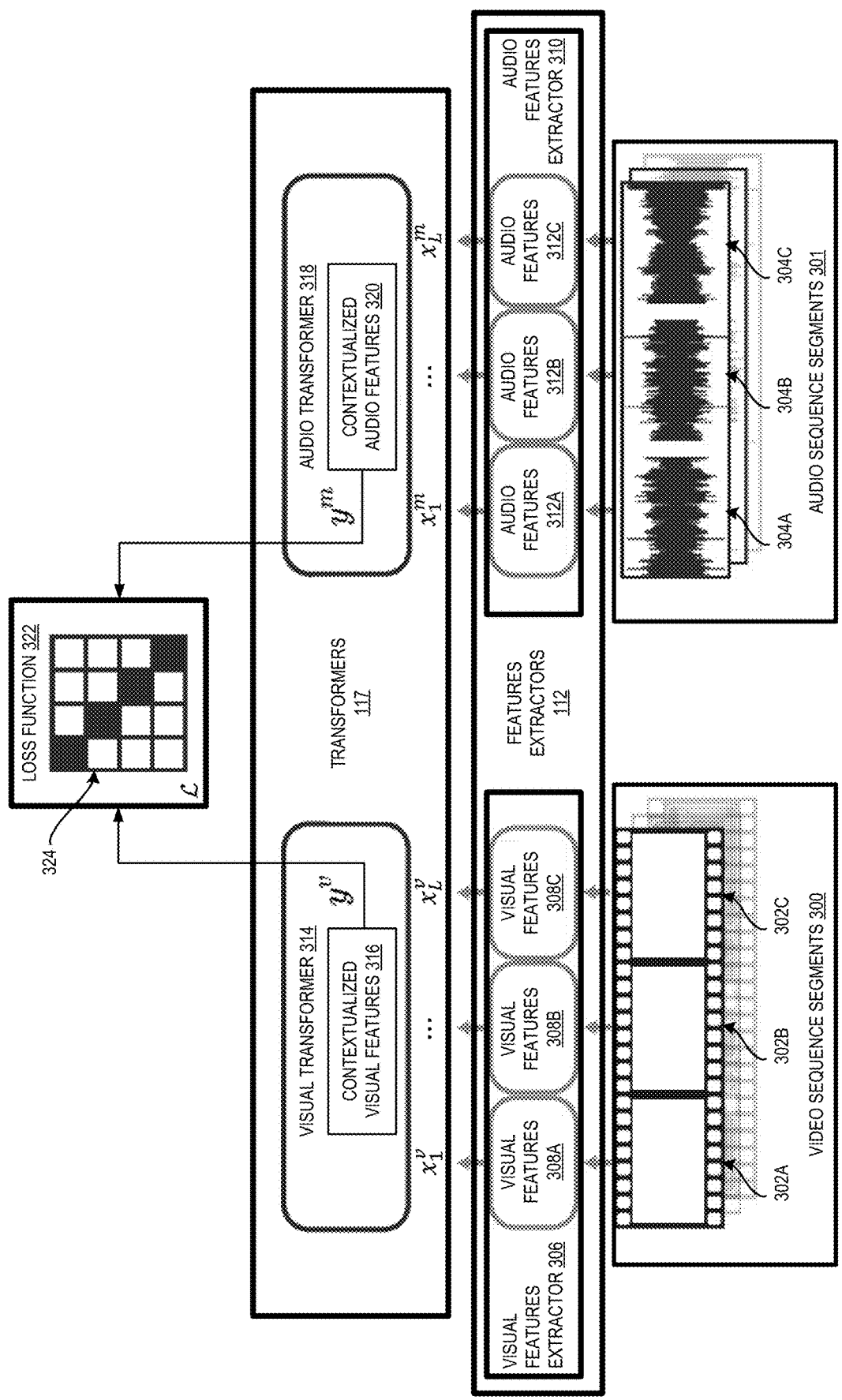
FIG. 3 illustrates an example process of generating contextualized features from a training input using transformers with a dual encoder architecture in accordance with one or more embodiments.

FIG. 3 illustrates an example process of generating contextualized features from a training input using transformers with a dual encoder architecture in accordance with one or more embodiments. As illustrated in FIG. 3, video sequence segments 300 are divided into a plurality of video segments 302A-C. Each video sequence segment of the plurality of video segments 302A-C can include portions of one or more scenes. Although only three video segments are depicted, in other examples, there can be a different number of video segments. The video segments 302A-C are then sent to feature extractors 112, where a visual features extractor 306 extracts visual features, or feature vectors, for each of the segments 302A-C. For example, visual features 308A are extracted from segment 302A, visual features 308B are extracted from segment 302B, and so on. As illustrated in FIG. 3, given a music video divided into segments, the visual features 308A-C for the video segments can be represented as $x_1^v$ to $x_L^v$. Visual features 308A-C are then sent to transformers 117, where a visual transformer 314 generates contextualized visual features 316. In one or more embodiments, the contextualized visual features 316 include a separate contextualized visual feature, or a contextualized feature vector for each of video segments 302A-C. A contextualized visual feature for a video segment is based on the visual features for the video segment and the visual features of other video segments. For example, the contextualized visual feature for segment 302B can be based on visual features 308B, as well as visual features 308A and 308C of segment 302A and 302C, respectively.

Similarly, audio sequence segments 300 are divided into a plurality of audio segments 304A-C. The audio segments 304A-C are then sent to feature extractors 112, where an audio features extractor 310 extracts audio features, or feature vectors, for each of the segments 304A-C. For example, audio features 312A are extracted from segment 304A, audio features 312B are extracted from segment 304B, and so on. As illustrated in FIG. 3, given a music video divided into segments, the audio features 312A-C for the audio segments can be represented as $x_1^m$ to $x_L^m$. Audio features 312A-C are then sent to transformers 117, where an audio transformer 318 generates contextualized audio features 320. In one or more embodiments, the contextualized audio features 320 include a separate contextualized audio feature, or contextualized feature vector, for each of audio segments 304A-C. A contextualized audio feature for an audio segment is based on the audio features for the audio segment and the audio features of other audio segments. For example, the contextualized audio feature for segment 304B can be based on audio features 312B, as well as audio features 312A and 312C of segment 304A and 304C, respectively.

In one or more embodiments, during the training phase, an index indicating an ordering, or temporal position, of segments is provided to one of the visual transformer 314 and audio transformer 318, while the index is masked out for the other. For example, if the index indicating the order of the video segments 302A-C is provided to the visual transformer 314, the index indicating the order of the audio segments 304A-C is not provided to the audio transformer 318. In such embodiments, by masking out, or otherwise not providing, the index to one of the transformers contributes to a more robust training of the visual transformer 314 and audio transformer 318.

As illustrated in FIG. 3, in one or more embodiments, the visual transformer takes $x^v$ as input and outputs $y^v = f_v(x^v)$, and the audio transformer takes $x^m$ as input and outputs $y^m = f_m(x^m)$, where $f(.; \theta)$ represents the functions whose parameters, $\theta$, are optimized.

Returning to FIG. 1, after the transformers 117 generate the contextualized visual features 118 and contextualized audio features 120, the contextualized visual features 118 and contextualized audio features 120 are sent to a segment matching module 122, as shown at numeral 7. Using the contextualized visual features 118 and contextualized audio features 120, the segment matching module 122 generates predicted video segment and audio segment pairings 124, as shown at numeral 8. In one or more embodiments, for a first video segment of the video sequence segments 108, the segment matching module 122 compares the first video segment's contextualized visual features with the contextualized audio features for each of the audio segments of the audio sequence segments 110 using a cosine similarity function, such as the following:

$$s(y^v, y^m) = \frac{y^{vT} y^m}{\|y^v\| \cdot \|y^m\|}$$

where $\tau$ is a hyperparameter. In one or more embodiments, $\tau$ is set to 0.3.

The segment matching module 122 can then rank the audio segments based on similarity values or metrics between the contextualized audio features and the first video segment's contextualized visual features, where the audio segment whose corresponding contextualized audio features are the most similar to the first video segment's contextualized visual features is chosen to pair with the first video segment. This process can then be repeated for other video segments of the video sequence segments 108.

Alternatively, the segment matching module 122 can generate the predicted video segment and audio segment pairings 124 in the reverse direction. For example, given a first audio segment of the audio sequence segments 110, the segment matching module 122 can compare the first audio segment's contextualized audio features with the contextualized video features for each of the video segments of the video sequence segments 108, rank the results based on their similarity, and select the most similar video segment from the video segments of the video sequence segments 108.

As the training input 100 included paired video and audio, the predicted video segment and audio segment pairings 124 includes ground truth pairings (e.g., correct pairings of video sequence segments with the audio sequence segments from the original paired video and audio) and mismatched pairings (e.g., incorrect pairings). In one or more embodiments, the similarity scores for ground truth and mismatched pairings are provided to a loss function 126, as shown at numeral 9. The loss function 126 can calculate the loss using the similarity scores for the ground truth pairings and mismatched pairings, as shown at numeral 10. The loss function encourages a high similarity to the ground truth pairings and a low similarity to mismatched pairings.

In one or more embodiments, the loss can be computed using an InfoNCE contrastive loss, as follows:

$$\mathcal{L}_{v \to m} = -\sum_{i}^{V} \sum_{l}^{L} \left[ \log \frac{\exp[s(y_{i,l}^{v}, y_{i,l}^{m})/\tau]}{\sum_{j}^{V} \sum_{l}^{L} \exp[s(y_{i,l}^{v}, y_{j,l}^{m})/\tau]} \right]$$

$s(y^v, y^m)$ is the similarity function, as described above. The equation shows a contrastive loss where the normalization is with respect to all the negative audio segments, given a video segment. In embodiments, a symmetric loss where the normalization is with respect to all the negative video segments, given an audio segment, is also used, and the two losses are averaged. For example, $\mathcal{L}_{m \to v}$ can be defined symmetrically, and the final loss can be calculated as $\mathcal{L} = \mathcal{L}_{v \to m} + \mathcal{L}_{m \to v}$, which can be used to train the transformers 117 using stochastic gradient descent.

FIG. 3 illustrates an alternative representation of calculating the loss used to train the transformers 117. As illustrated in FIG. 3, the contextualized visual features 118 (e.g., $y^v$) and contextualized audio features 120 (e.g., $y^m$) are passed as inputs to loss function 322. The goal of the loss function 322 is to encourage the visual and audio contextualized feature pair belonging to the same video to have high dot-product similarity, and low dot-product similarity if the pair comes from different videos. Each row in the grid 324 corresponds to a contextualized visual feature and each column corresponds to a contextualized audio feature). The filled cells along the diagonal of the grid 324 indicate high dot-product similarity for visual and audio contextualized feature pairs belonging to the same video, and the unfilled cells indicate low dot-product similarity for pairs belonging to different videos.

Returning to FIG. 1, the calculated loss can then be backpropagated to the transformers 117 and used to train the neural network, as shown at numeral 11.

Figure 4:
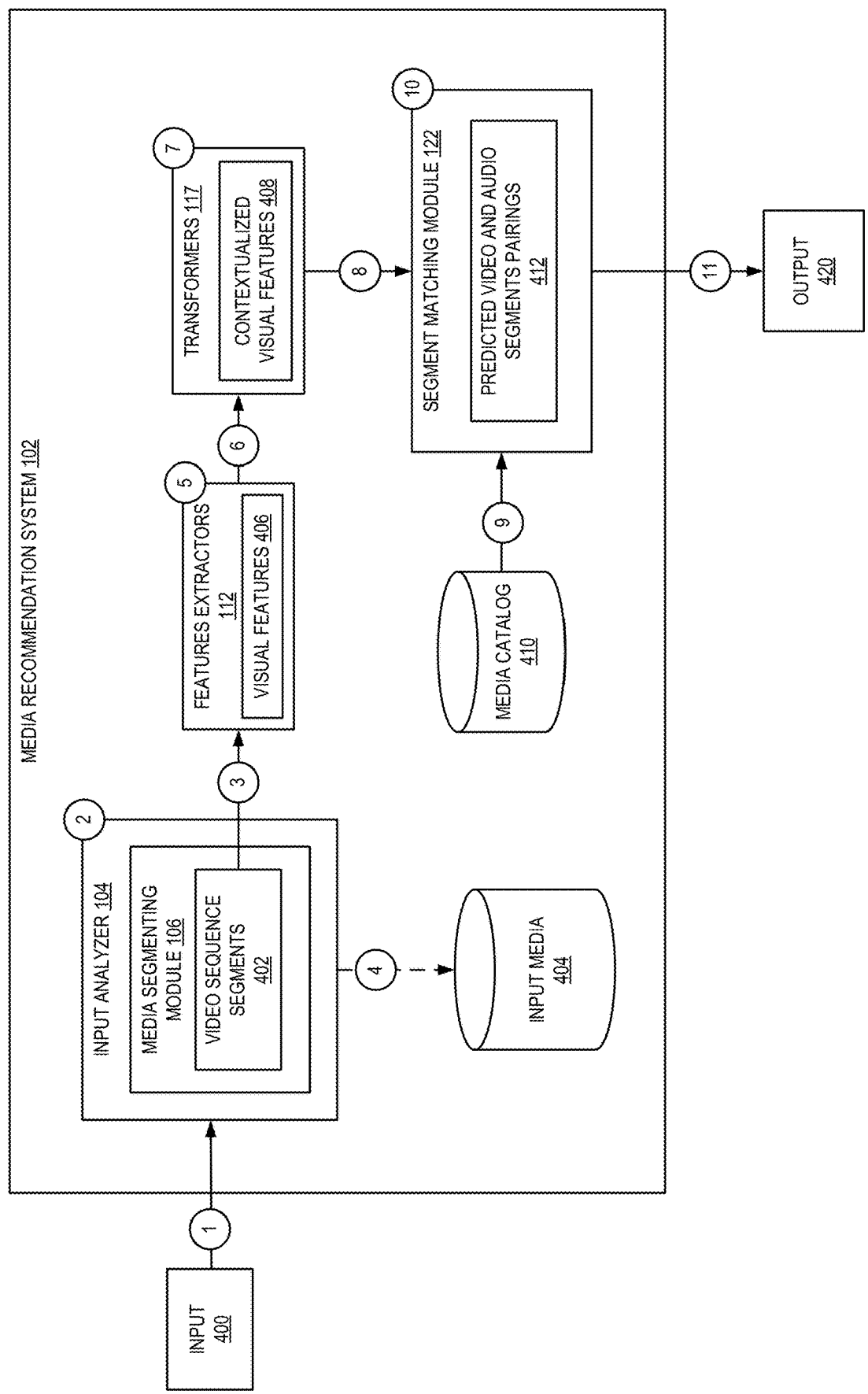
FIG. 4 illustrates a diagram of a process of generating audio sequence recommendations correlated to an input video sequence using a trained network in accordance with one or more embodiments.

FIG. 4 illustrates a diagram of a process of generating audio sequence recommendations correlated to an input video sequence using a trained network in accordance with one or more embodiments. As shown in FIG. 4, a media recommendation system 102 receives an input 400, as shown at numeral 1. For example, the media recommendation system 102 receives the input 400 from a user via a computing device or from a memory or storage location. In one or more embodiments, the input 400 includes a video sequence.

As illustrated in FIG. 4, the media recommendation system 102 includes an input analyzer 104 that receives the input 400. In some embodiments, the input analyzer 104 analyzes the input 400, as shown at numeral 2. In some embodiments, the input analyzer 104 analyzes the input 400 to extract the video sequence from the input 400. The input analyzer 104 can further include a media segmenting module 106 configured to split the video sequence into a plurality of segments, resulting in video sequence segments 402. After generating the video sequence segments 402, the input analyzer 104 sends the video sequence segments 402 to features extractors 112, as shown at numeral 3. In one or more other embodiments, the input analyzer 104 optionally stores the video sequence segments 402 in a memory or storage location (e.g., input media storage 404) for later access, as shown at numeral 4.

In one or more embodiments, the features extractors 112 includes a visual features extractor that is configured to extract strong modality-specific base features from the video sequence segments 402, as shown at numeral 5. In some embodiments, the visual features extractor is configured to extract visual features 406 from each of the video sequence segments 402. For example, given a video sequence that includes ten video sequence segments 402, the visual features extractor extracts a separate feature vector for each segment. In one or more embodiments, the feature vectors are n-dimensional vectors of numerical features that represent the video sequence. After the features extractors 112 generate the visual features 406, the visual features 406 are sent to transformers 117, as shown at numeral 6.

The transformers 117 are encoder neural networks. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the transformers 117 generate contextualized visual features 408 based on the visual features 406, as shown at numeral 7. For example, a visual transformer generates contextualized visual features 408, or a contextualized feature vector, for each of the video sequence segments 402 using the corresponding visual features 406. The contextualized visual features 408 for a specific video segment can be based on the visual features for the specific video sequence segment, in addition to visual features from other video sequence segments preceding and/or following the specific video sequence segment. After the transformers 117 generate the contextualized visual features 408, the contextualized visual features 408 are sent to a segment matching module 122, as shown at numeral 8.

In one or more embodiments, the segment matching module 122 can access a media catalog 410 to retrieve audio sequences, as shown at numeral 9. In one or more embodiments, the audio sequences in the media catalog 410 have been pre-processed through an audio features extractor and an audio transformer, in a process similar to the process described for the input video sequence, to generate contextualized audio features for segments of each audio sequence. In such embodiments, retrieving the audio sequences from the media catalog 410 includes retrieving associated contextualized audio features.

Using the contextualized visual features 406 and contextualized audio features corresponding to audio sequences from the media catalog 410, the segment matching module 122 generates predicted video segment and audio segment pairings 412, as shown at numeral 10. The segment matching module 122 can generate the predicted video segment and audio segment pairings 412 by comparing the contextualized visual features 406 to the contextualized audio features. In one or more embodiments, for each video segment of the video sequence segments 402, the segment matching module 122 compares the video segment's contextualized visual features 408 with the contextualized audio features for audio segments from the media catalog 410. The segment matching module 122 can then rank the audio segments based on similarity values or metrics between the contextualized audio features and the video segment's contextualized visual features, where the audio segment whose corresponding contextualized audio features are the most similar to the first video segment's contextualized visual features is chosen to pair with the first video segment. This process can then be repeated for other video segments of the video sequence segments 402.

In one or more embodiments, the media recommendation system 102 provides an output 420, including the predicted video segment and audio segment pairings 412, as shown at numeral 11. In one or more embodiments, after the process described above in numerals 1-10 the output 420 is sent to the user or computing device that initiated the media recommendation process with the media recommendation system 102, to another computing device associated with the user or another user, or to another system or application. For example, after the process described above in numerals 1-10, the predicted video segment and audio segment pairings 412 can be displayed in a user interface of a computing device.

In one or more other embodiments, instead of retrieving audio sequences from the media catalog 410, a collection of audio sequence options can be provided (e.g., by a user). For example, a user may provide, as input to the media recommendation system 102, a video sequence and plurality of candidate audio sequences that the user wants to be paired with the video sequence. Similar to the process described above, the media recommendation system 102 generates contextualized video features for the input video sequence and contextualized audio features for each of the plurality of candidate audio sequences and sorts the plurality of candidate audio sequences based on the similarity of their contextualized audio features to the contextualized video features for the input video sequence. In such embodiments, the media recommendation system 102 can provide an output that includes a recommendation indicating the order in which the plurality of candidate audio sequences most similarly matches each video sequence segment of the input video sequence.

Figure 5:
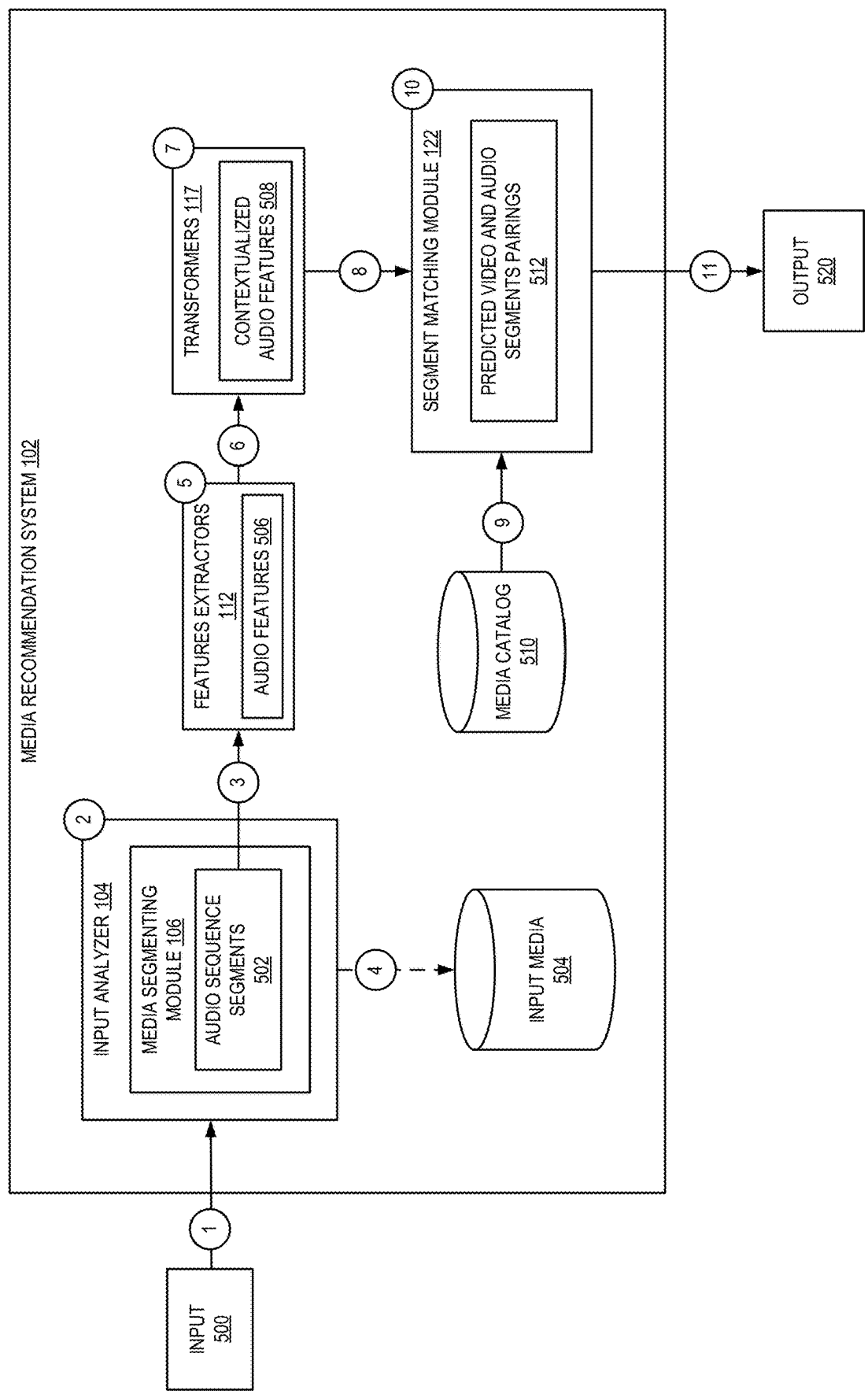
FIG. 5 illustrates a diagram of a process of generating video sequence recommendations correlated to an input audio sequence using a trained network in accordance with one or more embodiments.

FIG. 5 illustrates a diagram of a process of generating video sequence recommendations correlated to an input audio sequence using a trained network in accordance with one or more embodiments. As shown in FIG. 5, a media recommendation system 102 receives an input 500, as shown at numeral 1. For example, the media recommendation system 102 receives the input 500 from a user via a computing device or from a memory or storage location. In one or more embodiments, the input 500 includes an audio sequence.

As illustrated in FIG. 5, the media recommendation system 102 includes an input analyzer 104 that receives the input 500. In some embodiments, the input analyzer 104 analyzes the input 500, as shown at numeral 2. In some embodiments, the input analyzer 104 analyzes the input 500 to extract the audio sequence from the input 500. The input analyzer 104 can further include a media segmenting module 106 configured to split the audio sequence into a plurality of segments, resulting in audio sequence segments 502. After generating the audio sequence segments 502, the input analyzer 104 sends the audio sequence segments 502 to features extractors 112, as shown at numeral 3. In one or more other embodiments, the input analyzer 104 optionally stores the audio sequence segments 502 in a memory or storage location (e.g., input media storage 504) for later access, as shown at numeral 4.

In one or more embodiments, the features extractors 112 includes an audio features extractor that is configured to extract strong modality-specific base features from the audio sequence segments 502, as shown at numeral 5. In some embodiments, the audio features extractor is configured to extract audio features 506 from each of the audio sequence segments 502. For example, given an audio sequence that includes ten audio sequence segments 502, the audio features extractor extracts a separate feature vector for each segment. In one or more embodiments, the feature vectors are n-dimensional vectors of numerical features that represent the audio sequence. After the features extractors 112 generate the audio features 506, the audio features 506 are sent to transformers 117, as shown at numeral 6.

The transformers 117 are encoder neural networks. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the transformers 117 generate contextualized audio features 508 based on the audio features 506, as shown at numeral 7. For example, an audio transformer generates contextualized audio features 508, or a contextualized feature vector, for each of the audio sequence segments 502 using the corresponding audio features 506. The contextualized audio features 508 for a specific audio segment can be based on the audio features for the specific audio sequence segment, in addition to audio features from other audio sequence segments preceding and/or following the specific audio sequence segment. After the transformers 117 generate the contextualized audio features 508, the contextualized audio features 508 are sent to a segment matching module 122, as shown at numeral 8.

In one or more embodiments, the segment matching module 122 can access a media catalog 510 to retrieve stored video sequences, as shown at numeral 9. In one or more embodiments, the video sequences in the media catalog 510 have been pre-processed through a visual features extractor and a visual transformer, in a process similar to the process described for the input audio sequence, to generate contextualized visual features for segments of each video sequence. In such embodiments, retrieving the video sequences from the media catalog 510 includes retrieving associated contextualized visual features.

Using the contextualized audio features 506 and contextualized visual features corresponding to video sequences from the media catalog 510, the segment matching module 122 generates predicted video segment and audio segment pairings 512, as shown at numeral 10. The segment matching module 122 can generate the predicted video segment and audio segment pairings 512 by comparing the contextualized audio features 506 to the retrieved contextualized video features. In one or more embodiments, for each segment of the audio sequence segments 502, the segment matching module 122 compares the segment's contextualized audio features 508 with the contextualized visual features associated with video segments from the media catalog 510. The segment matching module 122 can then rank the video segments based on similarity values or metrics between the contextualized audio features and the video segments' contextualized visual features. For example, given a first audio segment, the video segment whose corresponding contextualized visual features are the most similar to the first audio segment's contextualized audio features is chosen to pair with the first audio segment. This process can then be repeated for other audio segments of the audio sequence segments 502.

In one or more embodiments, the media recommendation system 102 provides an output 520, including the predicted video segment and audio segment pairings 512, as shown at numeral 11. In one or more embodiments, after the process described above in numerals 1-10 the output 520 is sent to the user or computing device that initiated the media recommendation process with the media recommendation system 102, to another computing device associated with the user or another user, or to another system or application. For example, after the process described above in numerals 1-10, the predicted video segment and audio segment pairings 512 can be displayed in a user interface of a computing device.

In one or more other embodiments, instead of retrieving video sequences from the media catalog 510, a collection of video sequence options can be provided (e.g., by a user). For example, a user may provide, as input to the media recommendation system 102, an audio sequence and plurality of video sequences that the user wants to be paired with the audio sequence. Similar to the process described above, the media recommendation system 102 generates contextualized audio features for the input audio sequence and contextualized visual features for each of the plurality of input video sequences and sorts the plurality of input video sequences based on the similarity of their contextualized visual features to the contextualized audio features for the input audio sequence. In such embodiments, the media recommendation system 102 can provide an output that includes a recommendation indicating the order in which the plurality of input video sequences most similarly matches each audio sequence segment of the input audio sequence.

Figure 6:
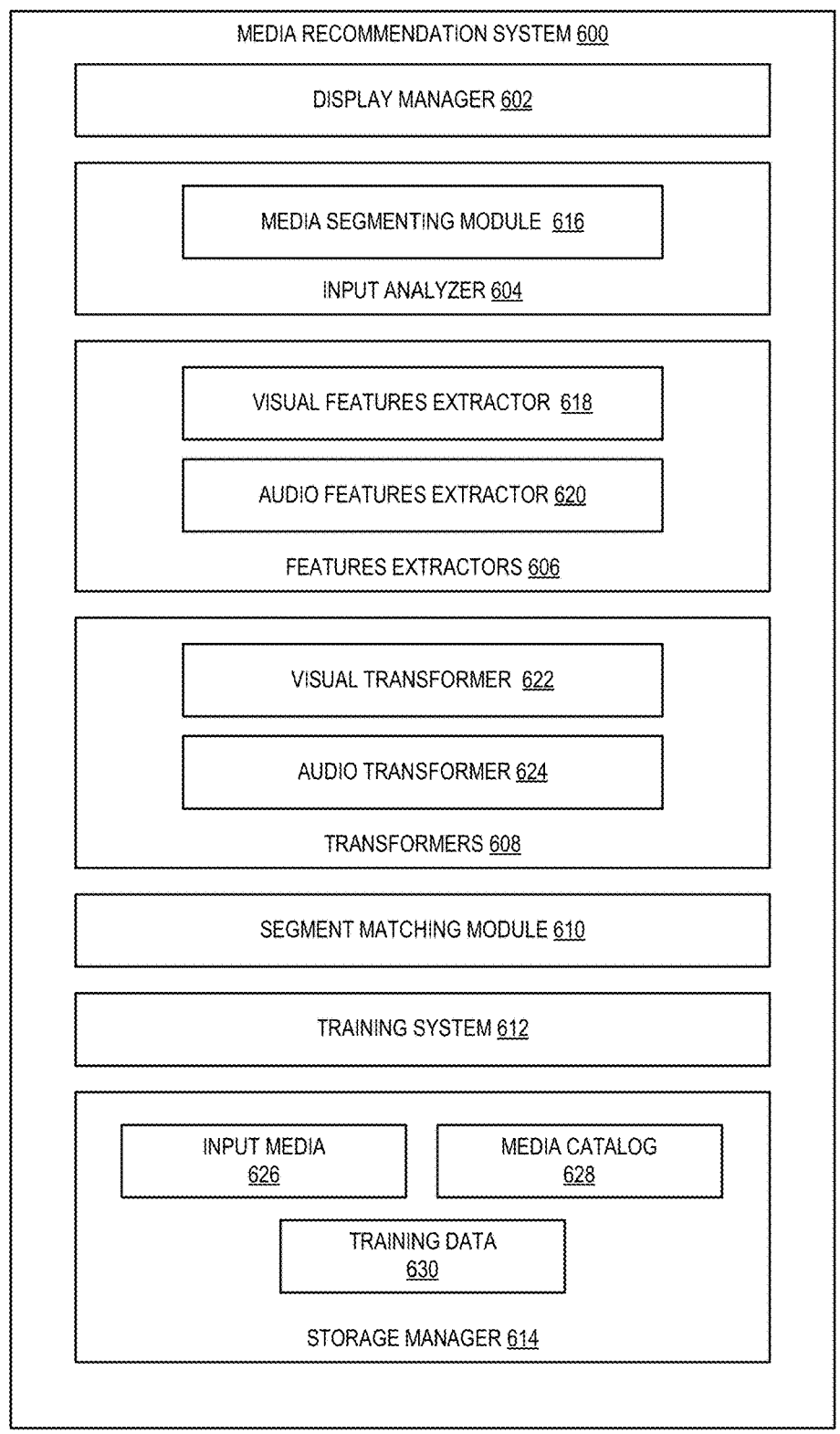
FIG. 6 illustrates a schematic diagram of a media recommendation system in accordance with one or more embodiments.

FIG. 6 illustrates a schematic diagram of a media recommendation system (e.g., "media recommendation system" described above) in accordance with one or more embodiments. As shown, the media recommendation system 600 may include, but is not limited to, a display manager 602, an input analyzer 604, features extractors 606, transformers 608, a segment matching module 610, a training system 612, and a storage manager 614. As shown, the input analyzer 604 includes a media segmenting module 616. The features extractors 606 includes a visual features extractor 618 and an audio features extractor 620. The transformers 608 include a visual transformer 622 and an audio transformer 624. The storage manager 614 includes input media 626, media catalog 628, and training data 630.

As illustrated in FIG. 6, the media recommendation system 600 includes a display manager 602. In one or more embodiments, the display manager 602 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 602 may identify, display, update, or otherwise provide various user interfaces that include one or more display elements in various layouts. In one or more embodiments, the display manager 602 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 6, the media recommendation system 600 also includes an input analyzer 604. The input analyzer 604 analyzes an input received by the media recommendation system 600 to identify video and/or audio sequences. In one or more embodiments, the input analyzer 604 also includes a media segmenting module 616 configured to segment input media into segments. For example, where the input media is a video sequence or an audio sequence, the media segmenting module 616 divides the input media into L segments, each of duration t. Where the input media is an artistically paired audio and video sequence (e.g., a music video), the media segmenting module 616 divides the paired video and audio sequences into separate sets L video sequence segment and audio sequence segments, each of duration t.

As further illustrated in FIG. 6, the media recommendation system 600 also includes features extractors 606. The features extractors include at least a visual features extractor 618 and an audio features extractor 620. The visual features extractor 618 is configured to extract visual features, or feature vectors, for each of the video sequence segments generated by the media segmenting module 616. The audio features extractor 620 is configured to extract audio features, or feature vectors, for each of the audio sequence segments generated by the media segmenting module 616. In one or more embodiments, the visual feature vectors and the audio feature vectors are n-dimensional vectors of numerical features that represent the video sequence and the audio sequence, respectively.

As further illustrated in FIG. 6, the media recommendation system 600 also includes transformers 608 configured to generate contextualized feature vectors for video sequences and/or audio sequences. The transformers 608 can be implemented as, or include, one or more machine learning models, such as a neural network or a deep learning model. In one embodiment, the transformers 608 are transformer encoder networks. The transformers 608 can include a visual transformer 622 configured to generate contextualized visual features from separate visual features for separate video sequence segments of a video sequence. The transformers 608 also include an audio transformer 624 configured to generate contextualized audio features from separate audio features for separate audio sequence segments of an audio sequence.

As further illustrated in FIG. 6, the media recommendation system 600 also includes a segment matching module 610 configured to compare contextualized visual features and contextualized audio features to predict pairings of video sequence segments and audio sequence segments. In one or more embodiments, where the input is a video sequence, for each video segment of a set of video sequence segments, the segment matching module 610 compares the video segment's contextualized visual features with the contextualized audio features for audio segments. The segment matching module 610 can then rank the audio segments based on calculating a similarity value or metric between the contextualized audio features and the video segment's contextualized visual features. In such embodiments, the segment matching module 610 selects the audio sequence segment that has the highest similarity to a video sequence segment, based on their associated feature vectors, as the audio sequence segment to pair with the video sequence segment. Where the input is an audio sequence, a similar process can be performed for each audio segment of a set of audio sequence segments.

As further illustrated in FIG. 6, the media recommendation system 600 includes training system 612 which is configured to teach, guide, tune, and/or train one or more neural networks. In particular, the training system 612 trains transformer encoder networks, such as visual transformer 622 and audio transformer 624, based on training data.

As further illustrated in FIG. 6, the storage manager 614 includes input media 626, media catalog 628, and training data 630. In particular, the input media 626 may include an input media sequence (e.g., audio and/or video sequences) received by the media recommendation system 600. The media catalog 628 may include a plurality of catalog audio sequences and video sequences. In some embodiments, where the audio sequences and video sequences have been pre-processed, the media catalog 628 includes contextualized visual feature and contextualized audio features generated by the transformers 608. In one or more embodiments, the training data 630 may include video sequences and audio sequences that have been artistically paired that can be used during a training process of the media recommendation system 600 to train transformer encoder networks.

Each of the components 602-614 of the media recommendation system 600 and their corresponding elements (as shown in FIG. 6) may be in communication with one another using any suitable communication technologies. It will be recognized that although components 602-614 and their corresponding elements are shown to be separate in FIG. 6, any of components 602-614 and their corresponding elements may be combined into fewer components, such as into a single facility or module, divided into more components, or configured into different components as may serve a particular embodiment.

The components 602-614 and their corresponding elements can comprise software, hardware, or both. For example, the components 602-614 and their corresponding elements can comprise one or more instructions stored on a computer-readable storage medium and executable by processors of one or more computing devices. When executed by the one or more processors, the computer-executable instructions of the media recommendation system 600 can cause a client device and/or a server device to perform the methods described herein. Alternatively, the components 602-614 and their corresponding elements can comprise hardware, such as a special purpose processing device to perform a certain function or group of functions. Additionally, the components 602-614 and their corresponding elements can comprise a combination of computer-executable instructions and hardware.

Furthermore, the components 602-614 of the media recommendation system 600 may, for example, be implemented as one or more stand-alone applications, as one or more modules of an application, as one or more plug-ins, as one or more library functions or functions that may be called by other applications, and/or as a cloud-computing model. Thus, the components 602-614 of the media recommendation system 600 may be implemented as a stand-alone application, such as a desktop or mobile application. Furthermore, the components 602-614 of the media recommendation system 600 may be implemented as one or more web-based applications hosted on a remote server. Alternatively, or additionally, the components of the media recommendation system 600 may be implemented in a suit of mobile device applications or "apps."

Figure 7:
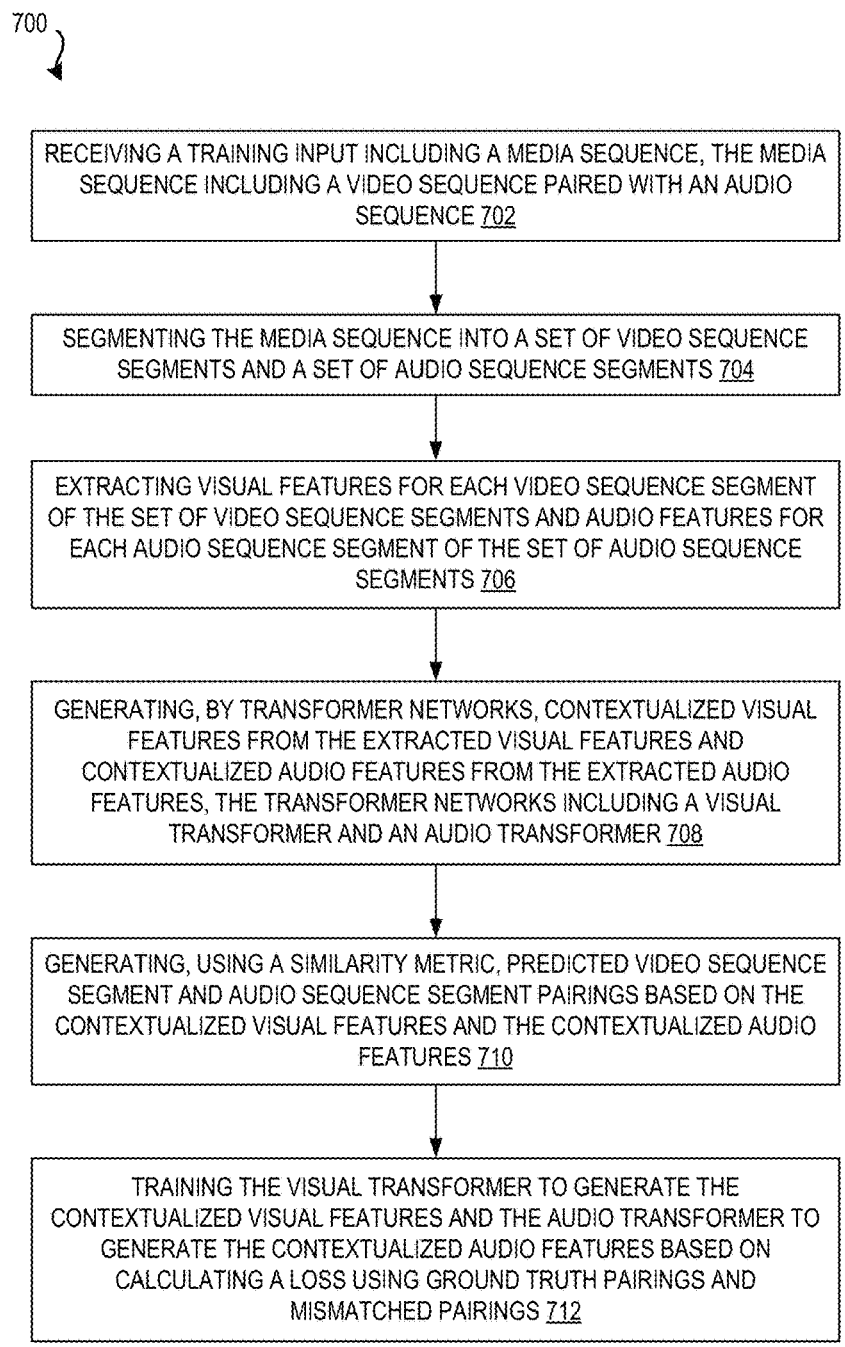
FIG. 7 illustrates a flowchart of a series of acts in a method of training a media recommendation system to correlate audio and video using a transformer network in accordance with one or more embodiments.
Figure 8:
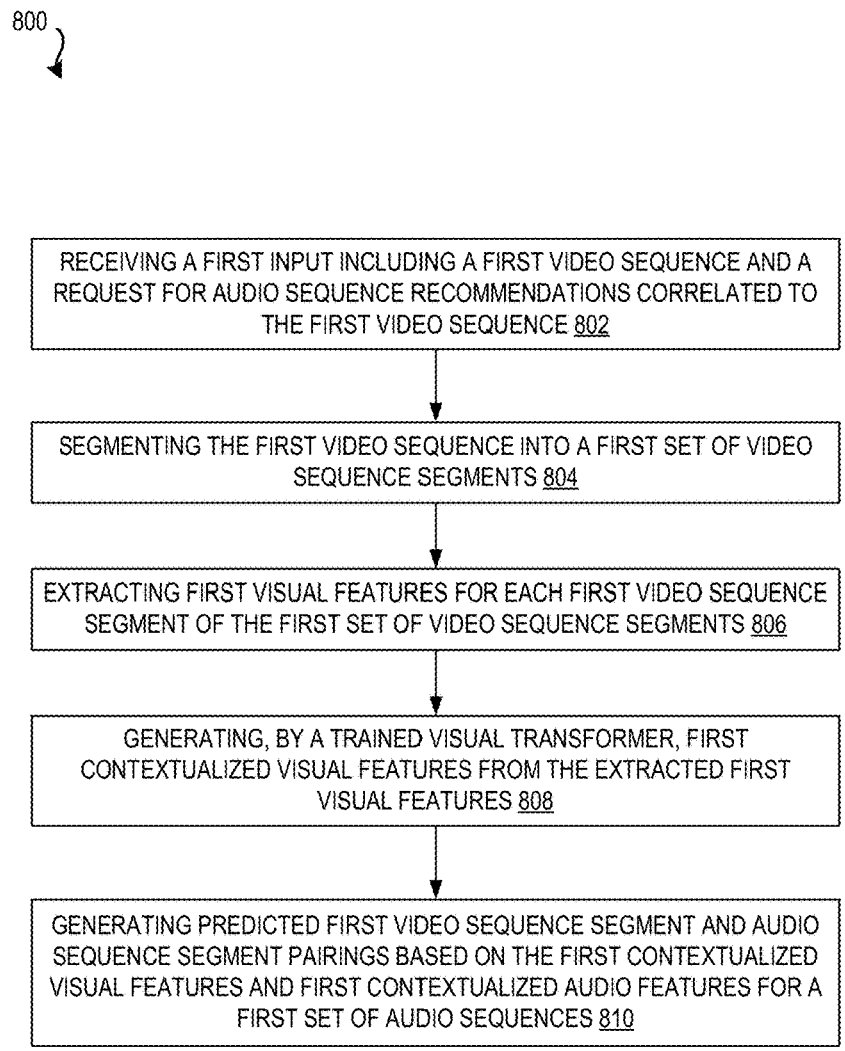
FIG. 8 illustrates a flowchart of a series of acts in a method of correlating audio and video using a trained transformer network in accordance with one or more embodiments.

FIGS. 1-6, the corresponding text, and the examples, provide a number of different systems and devices that allow a media recommendation system to generate audio or video sequence recommendations correlated to an input sequence. In addition to the foregoing, embodiments can also be described in terms of flowcharts comprising acts and steps in a method for accomplishing a particular result. For example, FIGS. 7 and 8 illustrate flowcharts of exemplary methods in accordance with one or more embodiments. The methods described in relation to FIGS. 7 and 8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of training a media recommendation system to correlate audio and video using a transformer network in accordance with one or more embodiments. In one or more embodiments, the method 700 is performed in a digital medium environment that includes the media recommendation system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving a training input including a media sequence, the media sequence including a video sequence paired with an audio sequence. The media sequence can be a music video, film clip, or another type of sequence where a video sequence has been artistically paired with an audio sequence. In one or more embodiments, the media recommendation system receives the training input from a user (e.g., via a computing device). In one or more embodiments, the user may select the media sequence in an application, or the user may submit the media sequence to a web service or an application configured to receive inputs. The media sequence can also be a portion selected from a longer media sequence. For example, after providing the media sequence to the application, the application can provide an interface to enable the user to select a portion of the longer media sequence.

As shown in FIG. 7, the method 700 also includes an act 704 of segmenting the media sequence into a set of video sequence segments and a set of audio sequence segments. In one or more embodiments, an input analyzer can extract an audio sequence and a video sequence from the media sequence. The media segmenting module can then break up or divide each sequence into a plurality of segments, resulting in video sequence segments and audio sequence segments. In one or more embodiments, the number of video sequence segments and the number of audio sequence segments is the same.

As shown in FIG. 7, the method 700 also includes an act 706 of extracting visual features for each video sequence segment of the set of video sequence segments and audio features for each audio sequence segment of the set of audio sequence segments. In some embodiments, a visual features extractor can be configured to extract visual features from each of the video sequence segments. Similarly, an audio features extractor can be configured to extract audio features from each of the audio sequence segments. The visual features and the audio features can be feature vectors that are n-dimensional vectors of numerical features that represent the video sequence and the audio sequence, respectively. Each of the video sequence segments and each of the audio sequence segments are represented by separate feature vectors. For example, where the media sequence has been segmented into 20 video sequence segments and 20 audio sequence segments, the visual features extractor generates 20 visual feature vectors and the audio features extractor generates 20 audio feature vectors.

As shown in FIG. 7, the method 700 also includes an act 708 of generating, by transformer networks, contextualized visual features from the extracted visual features and contextualized audio features from the extracted audio features, the transformer networks including a visual transformer and an audio transformer. In one or more embodiments, the visual transformer generates the contextualized visual features from the extracted visual features, where contextualized visual features for a first video sequence segment of the set of video sequence segments are based on visual features for the first video sequence segment and visual features for one or more other video sequence segments in the set of video sequence segments. For example, the contextualized visual features for the first video sequence segment can be based on, at least, the visual features of segments preceding and/or following the first video sequence segment. Similarly, contextualized visual features for a second video sequence segment are based on visual features for the second video sequence segment and visual features for one or more other video sequence segments in the set of video sequence segments, and so on.

The audio transformer can generate the contextualized audio features from the extracted audio features in a similar manner, where contextualized audio features for a first audio sequence segment of the set of audio sequence segments are based on first audio features for the first audio sequence segment and second audio features for one or more other audio sequence segments in the set of audio sequence segments.

As shown in FIG. 7, the method 700 also includes an act 710 of generating, using a similarity metric, predicted video sequence segment and audio sequence segment pairings based on the contextualized visual features and the contextualized audio features. In some embodiments, a segment matching module can generate the predicted video and audio sequence pairings. For example, for each video sequence segment of the set of video sequence segments, the segment matching module can calculate a similarity value between the contextualized visual features of the video sequence segment and the contextualized audio features each audio sequence segment of the set of audio sequence segments, or each audio sequence segment of a subset of the set of audio sequence segments. The segment matching module can then rank the audio sequence segments based on the calculated similarity value, and pair the video sequence segment with an audio sequence segment having a largest similarity value.

The segment matching module can also generate the predicted video and audio sequence pairings in a reverse manner. For example, for each audio sequence segment of the set of audio sequence segments, the segment matching module can calculate a similarity value between the contextualized audio features of the audio sequence segment and the contextualized visual features each video sequence segment of the set of video sequence segments, or each video sequence segment of a subset of the set of video sequence segments. The segment matching module can then rank the video sequence segments based on the calculated similarity value, and pair the audio sequence segment with a video sequence segment having a largest or highest similarity value.

As the training input included paired video and audio, the predicted video segment and audio segment pairings includes ground truth pairings (e.g., correct pairings of video sequence segments with the audio sequence segments from the original paired video and audio) and mismatched pairings (e.g., incorrect pairings).

As shown in FIG. 7, the method 700 also includes an act 712 of training the visual transformer to generate the contextualized visual features and the audio transformer to generate the contextualized audio features based on calculating a loss using the similarity scores for the mismatched pairings and the ground truth pairings. In one or more embodiments, the loss can be computed using an InfoNCE contrastive loss, and then backpropagated to the transformer network (e.g., the visual transformer and the audio transformer).

FIG. 8 illustrates a flowchart of a series of acts in a method of correlating audio and video using a trained transformer network in accordance with one or more embodiments. In one or more embodiments, the method 800 is performed in a digital medium environment that includes the media recommendation system 600. The method 800 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 800 includes an act 802 of receiving a first input including a first video sequence and a request for audio sequence recommendations correlated to the first video sequence. In one or more embodiments, the media recommendation system receives the first input from a user (e.g., via a computing device). In one or more embodiments, the user may select the first video sequence in an application, or the user may submit the first video sequence to a web service or an application configured to receive inputs. The first video sequence can also be a portion selected from a longer video sequence. For example, after providing the video sequence to the application, the application can provide an interface to enable the user to select a portion of the longer video sequence.

As shown in FIG. 8, the method 800 also includes an act 804 of segmenting the first video sequence into a first set of video sequence segments. In one or more embodiments, an input analyzer can extract video sequence segments from the first video sequence. In one or more embodiments, each of the video sequence segments are of the same length.

As shown in FIG. 8, the method 800 also includes an act 806 of extracting first visual features for each first video sequence segment of the first set of video sequence segments. In some embodiments, a visual features extractor can be configured to extract visual features from each of the video sequence segments. The visual features can be feature vectors that are n-dimensional vectors of numerical features that represent the video sequence. Each of the video sequence segments are represented by separate feature vectors. For example, where the video sequence has been segmented into 20 video sequence segments, the visual features extractor generates 20 visual feature vectors.

As shown in FIG. 8, the method 800 also includes an act 808 of generating, by a trained visual transformer, first contextualized visual features from the extracted first visual features. In one or more embodiments, the visual transformer generates the contextualized visual features from the extracted visual features, where contextualized visual features for a first video sequence segment of the first set of video sequence segments are based on visual features for the first video sequence segment and visual features for one or more other video sequence segments in the first set of video sequence segments. For example, the contextualized visual features for the first video sequence segment can be based on, at least, the visual features of segments preceding and/or following the first video sequence segment. Similarly, contextualized visual features for a second video sequence segment are based on visual features for the second video sequence segment and visual features for one or more other video sequence segments in the first set of video sequence segments, and so on.

As shown in FIG. 8, the method 800 also includes an act 810 of generating predicted first video sequence segment and audio sequence segment pairings based on the first contextualized visual features and first contextualized audio features for a first set of audio sequences. In one or more embodiments, the media recommendation system can display the predicted first video sequence segment and audio sequence segment pairings in a user interface. For example, the predicted first video sequence segment and audio sequence segment pairings can be presented on a user interface on the user computing device that submitted the request to perform the request for audio sequence recommendations. In such examples, the first video sequence segment and audio sequence segment pairings can be displayed as a ranked listing (e.g., to allow a user to sample or test the predicted pairings. The predicted first video sequence segment and audio sequence segment pairings can also be transmitted to the user computing device as a file or stored in a memory or storage location.

In one or more embodiments, the method described in FIG. 8 can be performed in a similar manner where the first input is a first audio sequence and the first input includes a request for video sequence recommendations correlated to the first audio sequence.

Figure 9:
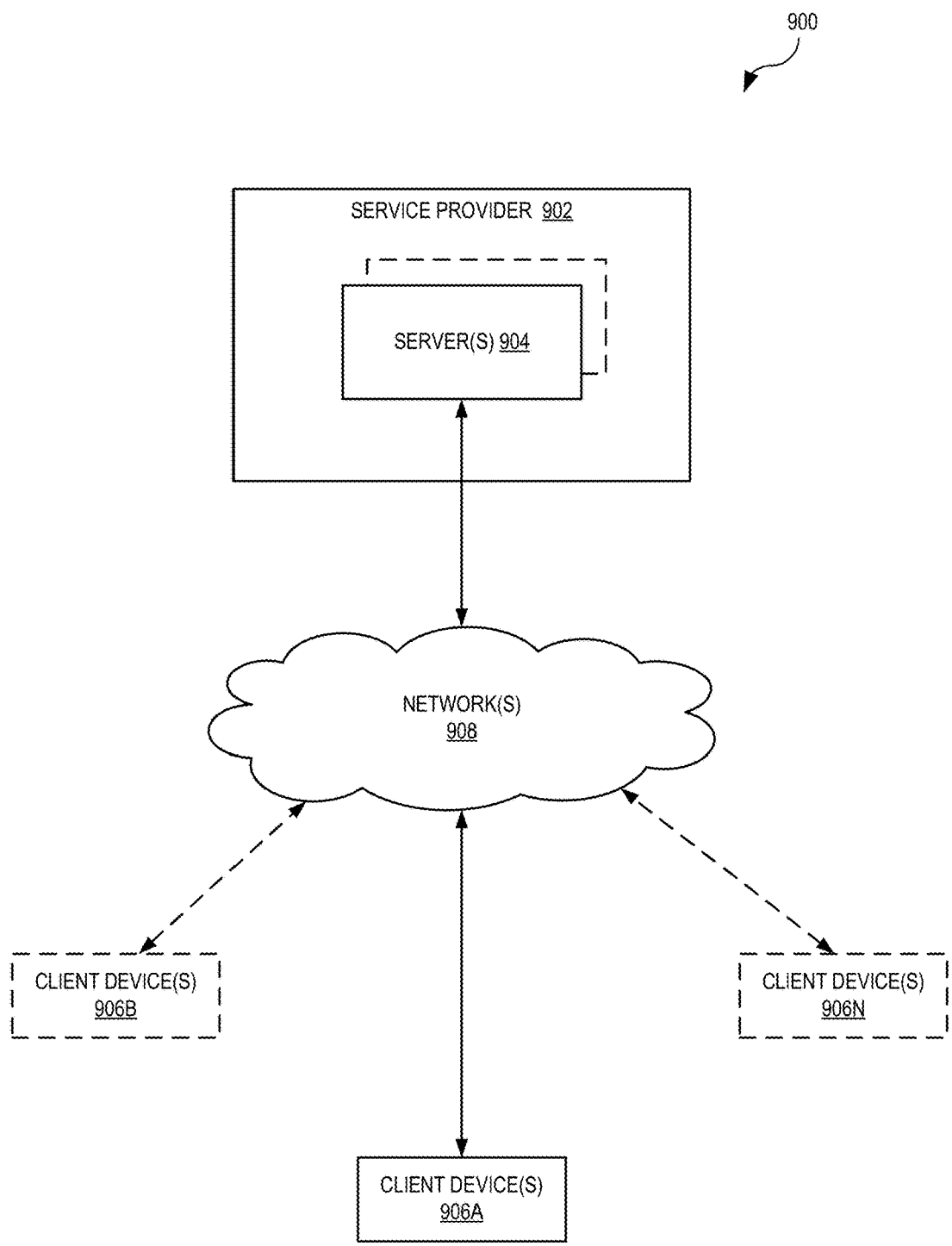
FIG. 9 illustrates a schematic diagram of an exemplary environment in which the media recommendation system can operate in accordance with one or more embodiments.

FIG. 9 illustrates a schematic diagram of an exemplary environment 900 in which the media recommendation system 600 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the media recommendation system 600. In particular, the media recommendation system 600 may be implemented in whole or in part on the client device 906A. Alternatively, in some embodiments, the environment 900 is implemented in a distributed architecture across multiple computing devices.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks.

Thus, the one or more networks 908 may be any suitable network over which the client devices 906A-906N may access the service provider 902 and server 904, or vice versa. The one or more networks 908 will be discussed in more detail below with regard to FIG. 10.

In addition, the environment 900 may also include one or more servers 904. The one or more servers 904 may generate, store, receive, and transmit any type of data, including input media 626, media catalog 628, and training data 630 or other information. For example, a server 904 may receive data from a client device, such as the client device 906A, and send the data to another client device, such as the client device 906B and/or 906N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the media recommendation system 600. In particular, the media recommendation system 600 can comprise an application running on the one or more servers 904 or a portion of the media recommendation system 600 can be downloaded from the one or more servers 904. For example, the media recommendation system 600 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or website hosted at the one or more servers 904.

Upon the client device 906A accessing a webpage or other web application hosted at the one or more servers 904, in one or more embodiments, the one or more servers 904 can provide a user of the client device 906A with an interface to provide inputs, including a media sequence, including video sequence, an audio sequence, and/or a paired audio sequence and video sequence. Upon receiving the input, the one or more servers 904 can automatically perform the methods and processes described above to correlate segments of video sequences with segments of audio sequences.

As just described, the media recommendation system 600 may be implemented in whole, or in part, by the individual elements 902-908 of the environment 900. It will be appreciated that although certain components of the media recommendation system 600 are described in the previous examples with regard to particular elements of the environment 900, various alternative implementations are possible. For instance, in one or more embodiments, the media recommendation system 600 is implemented on any of the client devices 906A-906N. Similarly, in one or more embodiments, the media recommendation system 600 may be implemented on the one or more servers 904. Moreover, different components and functions of the media recommendation system 600 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
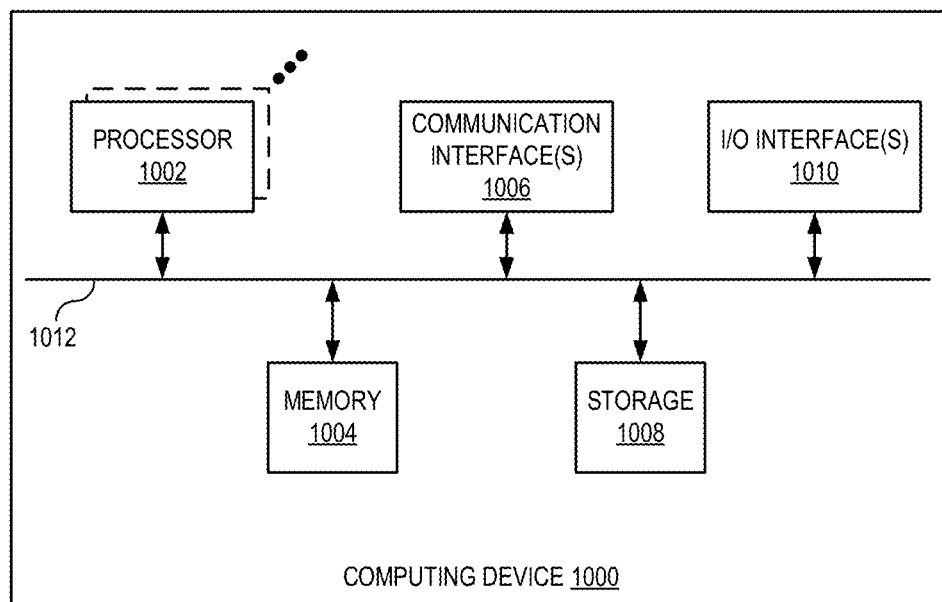
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the media recommendation system 600. As shown by FIG. 10, the computing device can comprise a processor 1002, memory 1004, one or more communication interfaces 1006, a storage device 1008, and one or more input or output ("I/O") devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more I/O devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving a training input including a media sequence, the media sequence including a video sequence paired with an audio sequence;
   segmenting the media sequence into a set of video sequence segments and a set of audio sequence segments;
   extracting visual features for each video sequence segment of the set of video sequence segments and audio features for each audio sequence segment of the set of audio sequence segments;
   generating, by transformer networks, contextualized visual features from the extracted visual features and contextualized audio features from the extracted audio features, the transformer networks including a visual transformer and an audio transformer;
   generating, using a similarity metric, predicted video sequence segment and audio sequence segment pairings based on the contextualized visual features and the contextualized audio features;
   ranking the predicted video sequence segment and audio sequence segment pairings based on their corresponding similarity values to identify mismatched pairings; and
   training the visual transformer to generate the contextualized visual features and the audio transformer to generate the contextualized audio features based on calculating a loss using ground truth pairings and the mismatched pairings.

2. The computer-implemented method of claim 1, wherein generating the contextualized visual features from the extracted visual features and the contextualized audio features from the extracted audio features comprises:
   generating, by the visual transformer of the transformer networks, the contextualized visual features from the extracted visual features, wherein contextualized visual features for a first video sequence segment of the set of video sequence segments are based on first visual features for the first video sequence segment and second visual features for one or more other video sequence segments in the set of video sequence segments; and
   generating, by the audio transformer of the transformer networks, the contextualized audio features from the extracted audio features, wherein contextualized audio features for a first audio sequence segment of the set of audio sequence segments are based on first audio features for the first audio sequence segment and second audio features for one or more other audio sequence segments in the set of audio sequence segments.

3. The computer-implemented method of claim 2, wherein generating the predicted video sequence segment and audio sequence segment pairings based on the contextualized visual features and the contextualized audio features comprises:
   for each video sequence segment of the set of video sequence segments:
      calculating a similarity value between the contextualized visual features of the video sequence segment and the contextualized audio features of each audio sequence segment of the set of audio sequence segments;
      ranking audio sequence segments of the set of audio sequence segments based on the calculated similarity value; and
      pairing the video sequence segment with an audio sequence segment having a largest similarity value.

4. The computer-implemented method of claim 2, wherein generating the predicted video sequence segment and audio sequence segment pairings based on the contextualized visual features and the contextualized audio features comprises:
   for each audio sequence segment of the set of audio sequence segments:
      calculating a similarity value between the contextualized audio features of the audio sequence segment and the contextualized visual features of each video sequence segment of the set of video sequence segments;
      ranking video sequence segments of the set of video sequence segments based on the calculated similarity value; and
      pairing the audio sequence segment with a video sequence segment having a largest similarity value.

5. The computer-implemented method of claim 1, wherein generating the contextualized visual features from the extracted visual features and the contextualized audio features from the extracted audio features comprises:
   providing an index of sequence segments to one of the visual transformer and the audio transformer, the index indicating an order of the sequence segments.

6. The computer-implemented method of claim 1, wherein segmenting the media sequence into the set of video sequence segments and the set of audio sequence segments comprises:
   segmenting the video sequence into a number of video sequence segments, wherein the number of video sequence segments is equal to a number of audio sequence segments segmented from the audio sequence.

7. A non-transitory computer-readable storage medium including instructions stored thereon which, when executed by at least one processor, cause the at least one processor to:

receive a training input including a media sequence, the media sequence including a video sequence paired with an audio sequence;

segment the media sequence into a set of video sequence segments and a set of audio sequence segments;

extract visual features for each video sequence segment of the set of video sequence segments and audio features for each audio sequence segment of the set of audio sequence segments;

generate, by transformer networks, contextualized visual features from the extracted visual features and contextualized audio features from the extracted audio features, the transformer networks including a visual transformer and an audio transformer;

generate, using a similarity metric, predicted video sequence segment and audio sequence segment pairings based on the contextualized visual features and the contextualized audio features;

rank the predicted video sequence segment and audio sequence segment pairings based on their corresponding similarity values to identify mismatched pairings; and train the visual transformer to generate the contextualized visual features and the audio transformer to generate the contextualized audio features based on calculating a loss using ground truth pairings and the mismatched pairings.

8. The non-transitory computer-readable storage medium of claim 7, wherein to generate the contextualized visual features from the extracted visual features and the contextualized audio features from the extracted audio features the at least one processor is further caused to:

generate, by the visual transformer of the transformer networks, the contextualized visual features from the extracted visual features, wherein contextualized visual features for a first video sequence segment of the set of video sequence segments are based on first visual features for the first video sequence segment and second visual features for one or more other video sequence segments in the set of video sequence segments; and generate, by the audio transformer of the transformer networks, the contextualized audio features from the extracted audio features, wherein contextualized audio features for a first audio sequence segment of the set of audio sequence segments are based on first audio features for the first audio sequence segment and second audio features for one or more other audio sequence segments in the set of audio sequence segments.

9. The non-transitory computer-readable storage medium of claim 8, wherein to generate the predicted video sequence segment and audio sequence segment pairings based on the contextualized visual features and the contextualized audio features the at least one processor is further caused to:

for each video sequence segment of the set of video sequence segments:
calculate a similarity value between the contextualized visual features of the video sequence segment and the contextualized audio features of each audio sequence segment of the set of audio sequence segments;

rank audio sequence segments of the set of audio sequence segments based on the calculated similarity value; and pair the video sequence segment with an audio sequence segment having a largest similarity value.

10. The non-transitory computer-readable storage medium of claim 8, wherein to generate the predicted video sequence segment and audio sequence segment pairings based on the contextualized visual features and the contextualized audio features the at least one processor is further caused to:

for each audio sequence segment of the set of audio sequence segments:
calculate a similarity value between the contextualized audio features of the audio sequence segment and the contextualized visual features of each video sequence segment of the set of video sequence segments;

rank video sequence segments of the set of video sequence segments based on the calculated similarity value; and pair the audio sequence segment with a video sequence segment having a largest similarity value.

11. The non-transitory computer-readable storage medium of claim 7, wherein to generate the contextualized visual features from the extracted visual features and the contextualized audio features from the extracted audio features the at least one processor is further caused to:

provide an index of sequence segments to one of the visual transformer and the audio transformer, the index indicating an order of the sequence segments.

12. The non-transitory computer-readable storage medium of claim 7, wherein to segment the media sequence into the set of video sequence segments and the set of audio sequence segments the at least one processor is further caused to:

segment the video sequence into a number of video sequence segments, wherein the number of video sequence segments is equal to a number of audio sequence segments segmented from the audio sequence.

13. A system comprising:
a memory component; and
a processing device coupled to the memory component, the processing device to perform operations comprising:

receiving a training input including a media sequence, the media sequence including a video sequence paired with an audio sequence;

segmenting the media sequence into a set of video sequence segments and a set of audio sequence segments;

extracting visual features for each video sequence segment of the set of video sequence segments and audio features for each audio sequence segment of the set of audio sequence segments;

generating, by transformer networks, contextualized visual features from the extracted visual features and contextualized audio features from the extracted audio features, the transformer networks including a visual transformer and an audio transformer;

generating, using a similarity metric, predicted video sequence segment and audio sequence segment pairings based on the contextualized visual features and the contextualized audio features;

ranking the predicted video sequence segment and audio sequence segment pairings based on their corresponding similarity values to identify mismatched pairings; and training the visual transformer to generate the contextualized visual features and the audio transformer to generate the contextualized audio features based on calculating a loss using ground truth pairings and the mismatched pairings.

14. The system of claim 13, wherein the operations of generating the contextualized visual features from the extracted visual features and the contextualized audio features from the extracted audio features further comprise:

generating, by the visual transformer of the transformer networks, the contextualized visual features from the extracted visual features, wherein contextualized visual features for a first video sequence segment of the set of video sequence segments are based on first visual features for the first video sequence segment and second visual features for one or more other video sequence segments in the set of video sequence segments; and generating, by the audio transformer of the transformer networks, the contextualized audio features from the extracted audio features, wherein contextualized audio features for a first audio sequence segment of the set of audio sequence segments are based on first audio features for the first audio sequence segment and second audio features for one or more other audio sequence segments in the set of audio sequence segments.

15. The system of claim 14, wherein the operations of generating the predicted video sequence segment and audio sequence segment pairings based on the contextualized visual features and the contextualized audio features further comprise:

for each video sequence segment of the set of video sequence segments:
calculating a similarity value between the contextualized visual features of the video sequence segment and the contextualized audio features of each audio sequence segment of the set of audio sequence segments;
ranking audio sequence segments of the set of audio sequence segments based on the calculated similarity value; and
pairing the video sequence segment with an audio sequence segment having a largest similarity value.

16. The system of claim 14, wherein the operations of generating the predicted video sequence segment and audio sequence segment pairings based on the contextualized visual features and the contextualized audio features further comprise:

for each audio sequence segment of the set of audio sequence segments:
calculating a similarity value between the contextualized audio features of the audio sequence segment and the contextualized visual features of each video sequence segment of the set of video sequence segments;
ranking video sequence segments of the set of video sequence segments based on the calculated similarity value; and
pairing the audio sequence segment with a video sequence segment having a largest similarity value.

17. The system of claim 13, wherein the operations of generating the contextualized visual features from the extracted visual features and the contextualized audio features from the extracted audio features further comprise:

providing an index of sequence segments to one of the visual transformer and the audio transformer, the index indicating an order of the sequence segments.

18. The system of claim 13, wherein the operations of segmenting the media sequence into the set of video sequence segments and the set of audio sequence segments further comprise:

segment the video sequence into a number of video sequence segments, wherein the number of video sequence segments is equal to a number of audio sequence segments segmented from the audio sequence.

* * * * *